(12) United States Patent
Kuan et al.

(10) Patent No.: US 10,719,313 B2
(45) Date of Patent: Jul. 21, 2020

(54) PROVIDING EXTERNAL ACCESS TO A PROCESSING PLATFORM

(71) Applicant: Palantir Technologies Inc., Palo Alto, CA (US)

(72) Inventors: Audrey Kuan, Los Altos, CA (US); Andrew Kaier, Seattle, WA (US); Eric Lee, Washington, DC (US); Jasjit Grewal, Bethesda, MD (US); Mark Elliot, London (GB); Nitish Kulkarni, Fremont, CA (US); Robert Fink, Munich (DE); Samuel Rogerson, Palo Alto, CA (US); Thomas Pearson, Middlesex (GB); Thomas Powell, London (GB); Lawrence Manning, New York, NY (US); Corey Garvey, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 16/251,578

(22) Filed: Jan. 18, 2019

(65) Prior Publication Data

US 2020/0167151 A1    May 28, 2020

(30) Foreign Application Priority Data

Nov. 22, 2018  (GB) ................................... 1818997.7

(51) Int. Cl.
*G06F 16/23*    (2019.01)
*G06F 8/71*    (2018.01)
(Continued)

(52) U.S. Cl.
CPC .............. *G06F 8/71* (2013.01); *G06F 9/3885* (2013.01); *G06F 9/4494* (2018.02);
(Continued)

(58) Field of Classification Search
None
See application file for complete search history.

(56) References Cited

U.S. PATENT DOCUMENTS 10,079,832 B1 *   9/2018   Dearment ............... H04L 63/10
2003/0182652 A1   9/2003   Custodio
(Continued)

FOREIGN PATENT DOCUMENTS

EP          3336690         6/2018
WO       WO 2017/222927   12/2017

OTHER PUBLICATIONS

Official Communication for European Patent Application No. 19152635.9 dated Apr. 1, 2019.

*Primary Examiner* — Philip Wang
*Assistant Examiner* — Rongfa P Wang
(74) *Attorney, Agent, or Firm* — Knobbe Martens Olson & Bear LLP (57) ABSTRACT

An apparatus, and a method, performed by one or more processors are disclosed. The method may comprise receiving a build request associated with performing an external data processing task on a first data set, the first data set being stored in memory associated with a data processing platform to be performed at a system external to the data processing platform. The method may also comprise generating a task identifier for the data processing task, and providing, in association with the task identifier, the first data set to an agent associated with the external system with an indication of the data processing task, the agent being arranged to cause performance of the task at the external system, to receive a second data set resulting from performance of the task, and to provide the second data set and associated metadata indicative of the transformation. The method may also comprise receiving the second data set and metadata from (Continued)

the agent associated with the external system and storing the second data set and associated metadata.

20 Claims, 6 Drawing Sheets (51) Int. Cl.
  *G06F 9/38* (2018.01)
  *G06F 9/48* (2006.01)
  *G06F 9/448* (2018.01)
(52) U.S. Cl.
  CPC ........ *G06F 9/4881* (2013.01); *G06F 16/2329* (2019.01); *G06F 16/2358* (2019.01)

(56) References Cited

U.S. PATENT DOCUMENTS

| | | |
|---|---|---|
| 2006/0059463 A1 | 3/2006 | Janssen et al. |
| 2011/0072493 A1* | 3/2011 | Morishita ............... G06F 21/31 726/3 |
| 2017/0139952 A1 | 5/2017 | Arasan et al. |
| 2019/0272271 A1* | 9/2019 | Bhattacharjee ..... G06F 16/2471 |
| 2020/0050607 A1* | 2/2020 | Pal .................... G06F 16/24545 |
| 2020/0065340 A1* | 2/2020 | Hodge ................. G06F 16/258 |
| 2020/0073865 A1* | 3/2020 | Jacob ................... G06F 16/256 |

* cited by examiner

PROVIDING EXTERNAL ACCESS TO A PROCESSING PLATFORM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to a method and systems for providing external access to processing platforms, for example for externally performing one or more tasks on one or more datasets stored in a data processing platform.

BACKGROUND

Cloud computing is a computing infrastructure for enabling ubiquitous access to shared pools of servers, storage, computer networks, applications and other data resources, which can be rapidly provisioned, often over a network, such as the Internet.

A "data resource" as used herein may include any item of data or code (e.g., a data object) that can be used by one or more computer programs. In example embodiments, data resources are stored in one or more network databases and are capable of being accessed by applications hosted by servers that share common access to the network database. A data resource may for example be a data analysis application, a data transformation application, a report generating application, a machine learning process, a spreadsheet or a database, or part of a spreadsheet or part of a database, e.g. records or datasets.

Some companies provide cloud computing services for registered customers, for example manufacturing, scientific and technology companies, to create, store, manage and execute their own resources via a network. This enables customers to offload data storage and data transformation, data analysis functions etc. to a cloud-based platform having appropriate resources and computing power for providing secure access to the data resources, potentially for many registered users of the customer.

The platform may also provide applications, services and microservices for performing additional functions, such as specific transformations or analysis on the data, thereby negating the need for the customer to install such applications, services and microservices on their own servers and provide the consequential support and maintenance.

Customers may wish to use their own applications, code or use languages in which they are fluent on their own datasets for example to perform a transformation task forming part of a data processing pipeline comprising multiple such tasks and/or datasets. For example, the customer may own a dedicated application that is not provided for by the platform, nor can be uploaded to the platform, e.g. due to its size, or due to confidentiality or licensing restrictions. For example, the customer may require the use of one or more data resources, such as a complex model, which contains a large set of data, possibly confidential data and/or requires specialist hardware to run. This may mean that it is not feasible to provide it to the integrated platform. Nonetheless, the customer may need to use one or more datasets stored on the integrated platform as input to the data resource and may need to provide the outputted data back to the integrated platform for storage or so that one or more further tasks of a pipeline can be carried out.

SUMMARY

According to a first aspect, there is provided a method, performed by one or more processors, the method comprising: receiving a build request associated with performing an external data processing task on a first dataset, the first data set being stored in memory associated with a data processing platform to be performed at a system external to the data processing platform; generating a task identifier for the data processing task; and providing, in association with the task identifier, a build request comprising an indication of the first data set and the data processing task to an agent associated with the external system, the agent being arranged to cause performance of the task at the external system, to receive a second dataset resulting from performance of the task, and to provide the second dataset and associated metadata indicative of the transformation to the data processing platform.

The method may further comprise receiving the second dataset and associated metadata from the agent associated with the external system; and storing the second dataset and associated metadata in the data processing platform.

The method may further comprise storing the task identifier for the build request in a co-ordinator function that receives one or more build queries from the external system, or a service associated with the external system, for providing the build request to the agent.

The co-ordinator function may store multiple task identifiers for multiple other build requests for providing one or more build requests to the agent.

The co-ordinator function may remove task identifiers, or flags task identifiers as used, responsive to receiving a completion message from the agent, such that subsequent build queries from the same external system do not cause re-provision of the same datasets.

The one or more build queries may be polling queries received periodically from the external system, or a service associated with the external system.

The method may further comprise generating a token associated with the build request for enabling verification at the data processing platform that the received second dataset corresponds to the build request.

The metadata may comprise one or more of: at least part of the code used on the external system to perform the data processing task; the version number of the code used on the external system to perform the data processing task; an ontology or schema; the date the code was last updated; and a hash of the code.

The method may further comprise transmitting an update query to the external system, and responsive thereto, receiving an indication of one or more updates made to code used on the external system to perform the data processing task.

The update query may be transmitted periodically as a polling request.

The method may further comprise, responsive to receiving an indication of one or more updates made to the code on the external system, flagging the second dataset, and/or any other dataset generated as a result of performance of the data processing task, as being out of date.

The method may further comprise displaying a prompt on a user interface indicating the second and/or other datasets flagged as out of date.

The method may further comprise preventing further data processing tasks being performed on the second and/or other datasets flagged as out of date.

The method may further comprise automatically generating a new build request for performing the data processing task on the first dataset for generating a new dataset to replace the second and/or other datasets flagged as out of date.

The external data processing task may comprise one task of a data processing pipeline comprising two or more tasks, and wherein the received second dataset is provided as input to a further task which performs a further data processing task to generate a third dataset.

According to another aspect, there may be provided a method, performed by one or more processors, the method comprising: identifying, at a system external to a data processing platform, a build request derived from the data processing platform associated with performing a data processing task on a first dataset, the first dataset being stored in memory associated with the data processing platform; receiving, responsive to the identification, the build request, including an identification of the first dataset and the data processing task; receiving the first data set from the data processing platform; causing performance of the data processing task at the external system; receiving a second dataset resulting from performance of the task; and sending the second dataset and associated metadata indicative of the transformation to the data processing platform.

The method may further comprise transmitting one or more build queries to the data processing platform for causing receiving of the build request.

The one or more build queries may be polling queries periodically transmitted to the data processing platform.

The method may further comprise receiving a token associated with the build request for transmitting to the data processing platform when requesting the first dataset and/or sending the second dataset such that the data processing platform may determine that they correspond to the build request.

The metadata may comprise one or more of: at least part of the code used on the external system to perform the data processing task; the version number of the code used on the external system to perform the data processing task; an ontology or schema; the date the code was last updated; the last run date of the code, logic or dataset; logs; and a hash of the code.

The method may further comprise receiving an update query from the data processing platform, and responsive thereto, transmitting an indication of one or more updates made to code to perform the data processing task.

The method may further comprise, upon receiving the build request from the data processing platform, creating a directory for holding the first data set and the second dataset and associated metadata, and removing the directory subsequent to the second dataset and associated metadata being sent to the data processing platform.

According to another aspect, there is provided a computer program, optionally stored on a non-transitory computer readable medium program which, when executed by one or more processors of a data processing apparatus, causes the data processing apparatus to carry out a method according to any preceding method definition.

According to another aspect, there is provided an apparatus configured to carry out a method according to any preceding method definition, the apparatus comprising one or more processors or special-purpose computing hardware.

BRIEF DESCRIPTION OF THE DRAWINGS

Example embodiments will now be described by way of non-limiting example with reference to the accompanying drawings, in which.

DETAILED DESCRIPTION

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary descriptions.

Example embodiments relate to enabling external access to a data processing platform. Example embodiments also relate to performance of one or more processing tasks or operations at a system external to the data processing platform, typically remote from the data processing platform. The data processing platform may be a cloud-based platform, offering access to customers for the purposes of one or more of storage, applications, analysis and reporting via data resources. The data processing platform may be termed an integrated data processing platform on account of it providing multiple applications for multiple datasets for, potentially multiple customers having multiple users. A customer may be a company providing technology or scientific services, or indeed other services.

As mentioned, a "data resource" as used herein may include any item of data or code (e.g., a data object) that can be used by one or more computer programs. In example embodiments, data resources may be stored in one or more network databases or on external databases and may be capable of being accessed by applications hosted by servers that share common access to the network database. A data resource may for example be a data analysis application, a data transformation application, a report generating application, a machine learning process, a spreadsheet or a database, or part of a spreadsheet or part of a database, e.g. records or datasets. The term dataset is used herein generically.

A data transform may be any operation that takes one or more datasets, e.g. tables, and produces one or more datasets with some modification, e.g. by joining, merging, splitting, incrementing, decrementing or performing any computational algorithm.

A data processing task, or simply "task", is a requested operation that may comprise performance of one or more data transforms.

A data processing pipeline is a series of two or more tasks whereby one or more datasets may provide the input to a first task and the output from the first task may provide at least part of the input to a second task. Data processing pipelines may comprise many tasks, some of which may be performed in series and some of which may be performed in parallel. A task which takes data from the output of another task may be considered dependent on the other task.

Figure 1:
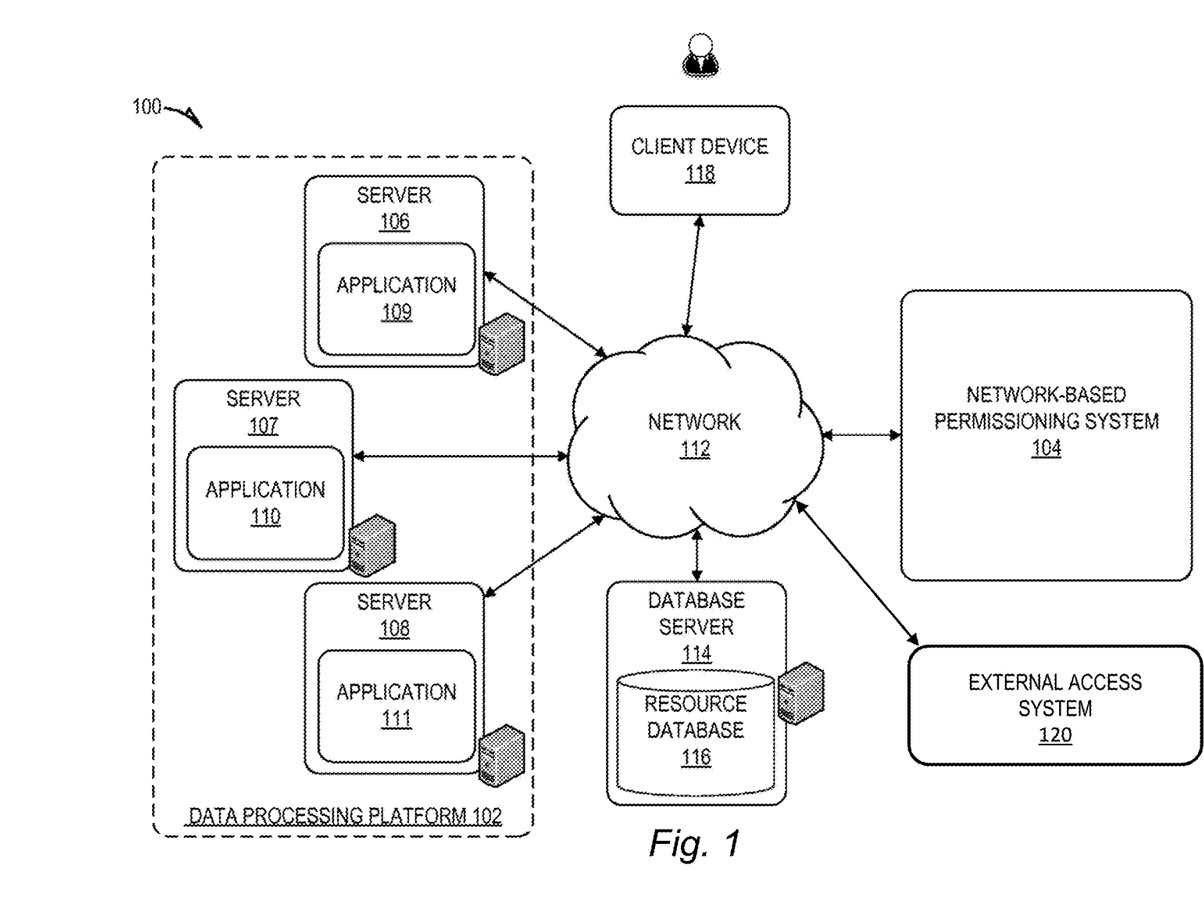
FIG. 1 is a network diagram depicting a network system comprising a data processing platform in communication with an external access system.

FIG. 1 is a network diagram depicting a network system 100 comprising a data processing platform 102 in communication with an external access system 120 and also a network-based permissioning system 104 configured for evaluating access permissions for data resources to which the group of application servers 106-108 share common access, according to an example embodiment. Consistent with some embodiments, the network system 100 may employ a client-server architecture, though the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

In the example of FIG. 1, the data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

Each of the servers 106-108 may be in communication with the network-based permissioning system 104 and external access system 120 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a database server 114. The resource database 116 stores data resources that may be used by any one of the applications 109-111 hosted by the data processing platform 102.

The external access system 120 is configured to perform the co-ordination of data build requests from one or more users. A data build request may be a user or computer-initiated request to perform some task at a specified external system. The specified external system may be identified with a unique identifier, by the login details of the user (associated with a particular system, as determined by the network-based permissioning system 104), by a URL, through a user interface, through code or any combination thereof. The task may be one task of multiple tasks comprising a data processing pipeline. Therefore, in some example embodiments, the customer may wish the data processing platform 102 to perform some or most of the multiple tasks, but for various reasons, may wish for one or more other tasks to be performed at a specified other external system, e.g., a computer system or network that is remote from and/or in a different domain than the data processing platform 102.

The reasons that a customer may require this are numerous. For example, a customer may wish to use their own application or use a language in which they are fluent on their own datasets stored at the data processing platform 102, for example to perform a transformation task within part of a data processing pipeline comprising multiple such tasks and/or datasets. For example, a customer may have legacy code in their own computing infrastructure that they may not wish to migrate to the data processing platform, at least presently, although they may wish to connect to it via the data processing platform. For example, the customer may own a dedicated application that is not provided for by the data processing platform 102, nor can be uploaded to the platform, e.g. due to its size (it may be too large to transfer efficiently over a network), or due to confidentiality or licensing restrictions. For example, the customer may require the use of one or more data resources, such as a complex model, which contains a large set of data, possibly confidential data and/or requires specialist hardware to run. This may mean that it is not feasible to provide it to the data processing platform 102. For example, the customer may simply wish to retain control over their own data resources.

In overview, the external access system 120 is configured to communicate with a so-called external connector provided at the external system that handles performance of one or more tasks at the external system based on data derived from the data processing platform 102. The external access system 120 may also provide the resulting one or more datasets back to the data processing platform 102 for storage. The external connector may be provided as a custom plug-in that may be deployed to any external system of any customer associated with the data processing platform 102, and having need for performance of external tasks.

Advantageously, the external access system 120 may be application or code agnostic; that is, the external access system 120 does not need to understand the specific application or code that will be used for performance of the task. The external access system 120 provides the co-ordination functionality to handle new build requests initiated by customers (e.g., their users, if so authorised), to co-ordinate over a network with the appropriate plug-in of the customer in order to transfer one or more requested datasets to the plug-in, and subsequently to receive one or more transformed datasets that result from performance of one or more tasks performed externally.

As shown, the network system 100 also includes a client device 118 in communication with the data processing platform 102, the network-based permissioning system 104 and the external access system 120 over the network 106. The external access system 120 can reside within the data processing platform 102 in some embodiments. The client device 118 communicates and exchanges data with the data processing platform 102 and may also communicate with the network-based permissioning system 104 and the external access system 120 over the network 106.

The client device 118 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
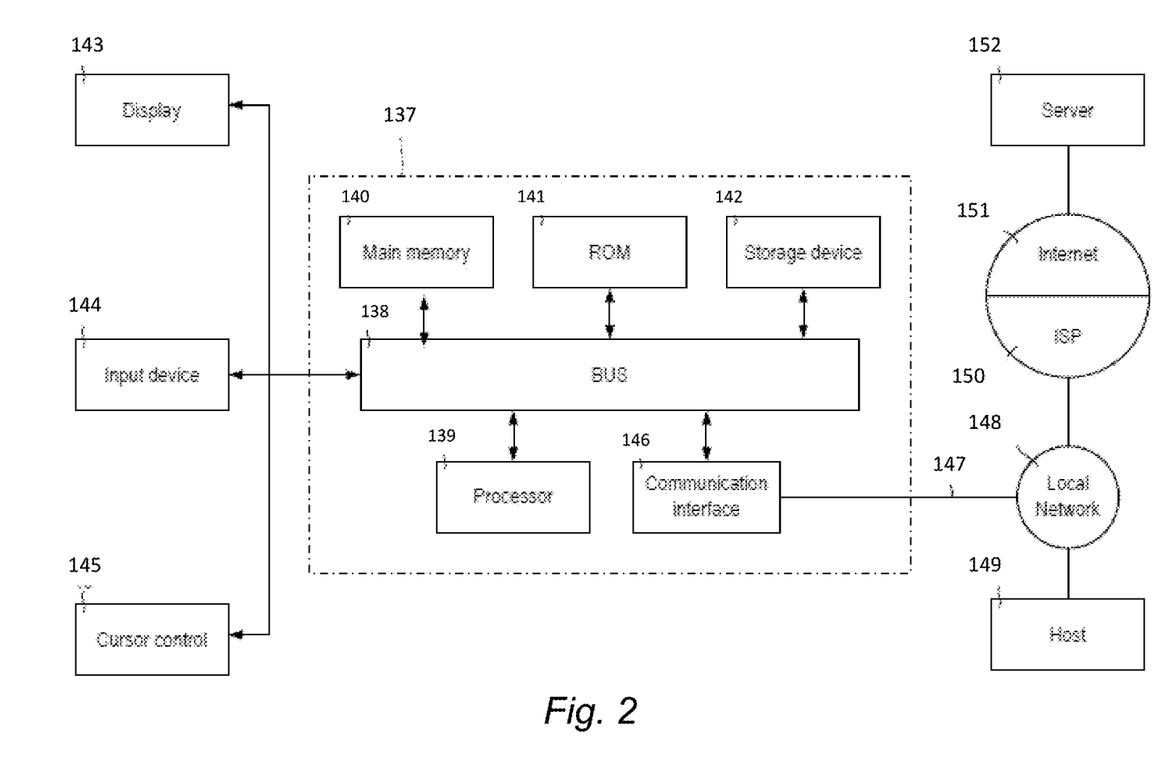
FIG. 2 is a block diagram of a computer system according to embodiments of this specification.

Referring to FIG. 2, a block diagram of an exemplary computer system 137, which may comprise the data processing platform 102, one or more of the servers 106-108, the database server 114, the authentication system 120 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor1 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 40 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

Figure 3:
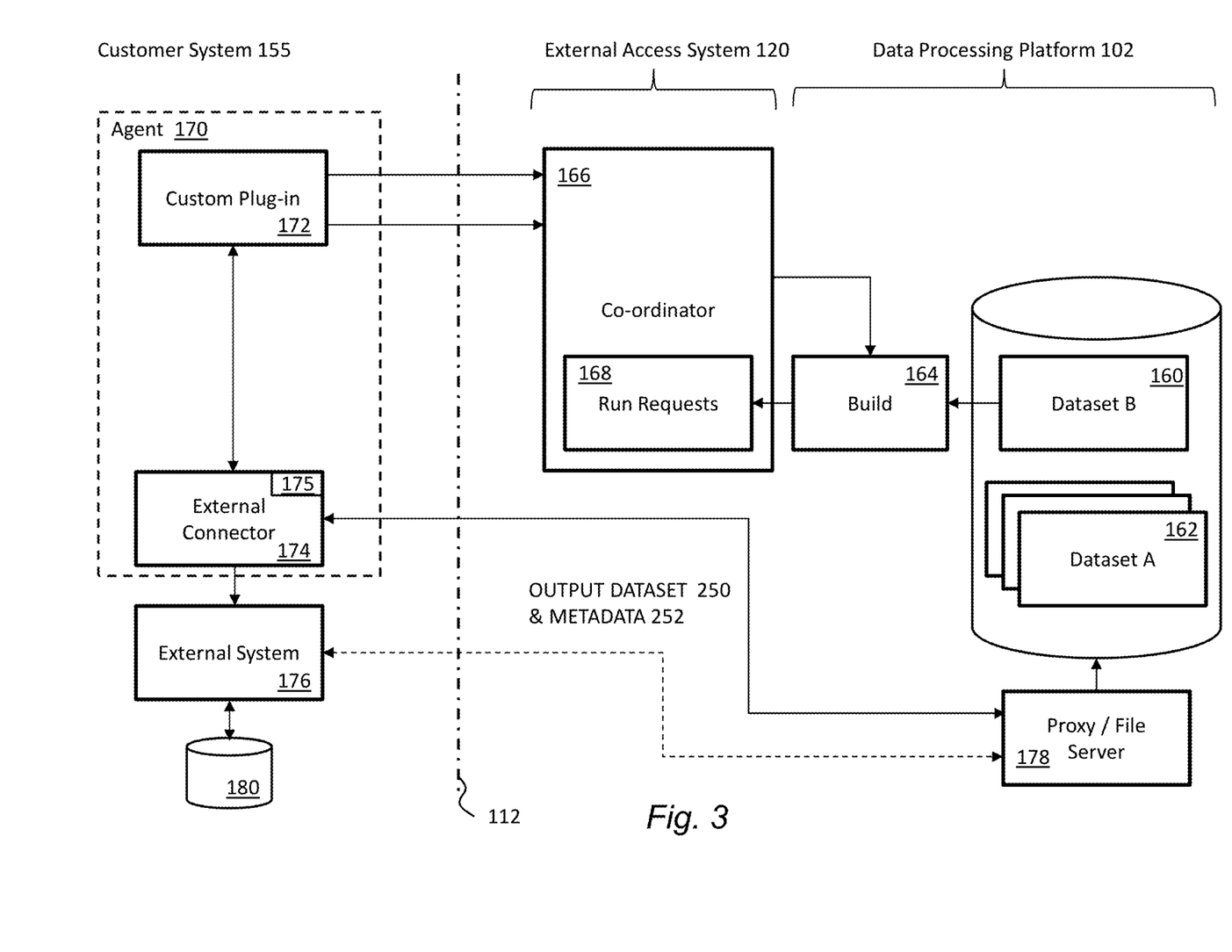
FIG. 3 is a block diagram of components of the FIG. 1 external access system and an agent associated with a customer system, according to example embodiments.

Referring to FIG. 3, a more detailed view of the external access system 120 is shown as well as an associated agent 170 which has been deployed or otherwise provided at a customer system 155. In the shown example, the external access system 120 is provided, as in FIG. 1, as a separate processing entity to the data processing platform 102. However, it should be appreciated that in other embodiments the external access system 120 may comprise a part of the data processing platform 102.

The external access system 120 and the customer system 155 are remote from one another and communicate over the network 112.

The data processing platform 102 may store one or more datasets 160, 162 associated with a particular customer, for example the customer associated with the customer system 155. For example, the one or more datasets 160, 162 may comprise any form of data, and may represent engineering data, data maintenance data, computer network status data, fault data, and the datasets 160, 162 may be represented in any suitable data structure, for example as persisted datasets or tables. For example, one dataset 160 may be referred to as dataset "B" which may require some task to be performed on it, e.g. a transformation of any of the above types. To recap, a transformation may be any of a number of operations that are performed on one or more datasets to generate yet another dataset. Each dataset transformation may be associated with an implementation that includes code for causing a particular operation to be performed. However, use of the term data processing task is not limited to the performance of transformations.

The data processing platform 102 may also comprise a data proxy/file server 178 which handles real-time or batch transfers of data to/from the customer system 155 over the network 112, depending on the size of data files or data streams. Additionally, or alternatively, input data may also come via the co-ordinator module 166 through the agent 170 and the custom plug-in 172.

The external access system 120 may comprise a co-ordinator module 166 having a run requests service 168 that may be an object which maintains build identifiers associated with build requests received from a build module 164. The build module 164 is configured to receive build requests from users, e.g. customers, and to generate build identifiers for the run requests service 168 of the co-ordinator module 166.

At the customer system 155, an agent 170 is provided which may comprise or at least include a custom plug-in 172. An external connector module 174 may also be comprised within the agent, the external connector module being configured to manage the performance of the requested one or more tasks at an external system 176, which is the module that will perform the requested one or more tasks. In some embodiments, the external connector module 174 may be provided as an independent module, e.g. as an independent REST service, or other independent service, so long as the Agent 170 and the custom plug-in 172 may communicate with the external connector module and the external connector module may communicate with the external system 176. The external system 176 may be a computer or server forming part of the customer system 155, e.g. a customer network. This may include enabling receiving and/or sending datasets from and/or to the data processing platform 102 via the proxy/file server 178. The external connector module 174 may also communicate with the external system 176, e.g. to send the fetched one or more datasets and/or to receive one or more transformed datasets for sending to the data processing platform 102. In some embodiments, the external system 176 may directly communicate with the data processing platform 102 via the proxy/file server 178.

The external system 176 may be any application or system for performing one or more tasks, e.g., externally of the data processing platform 102. For example, the external system 176 may be a computer, server, or a database controller. The external system 176 may have access to a local database 180 and/or a file system on which local datasets are stored.

Figure 4:
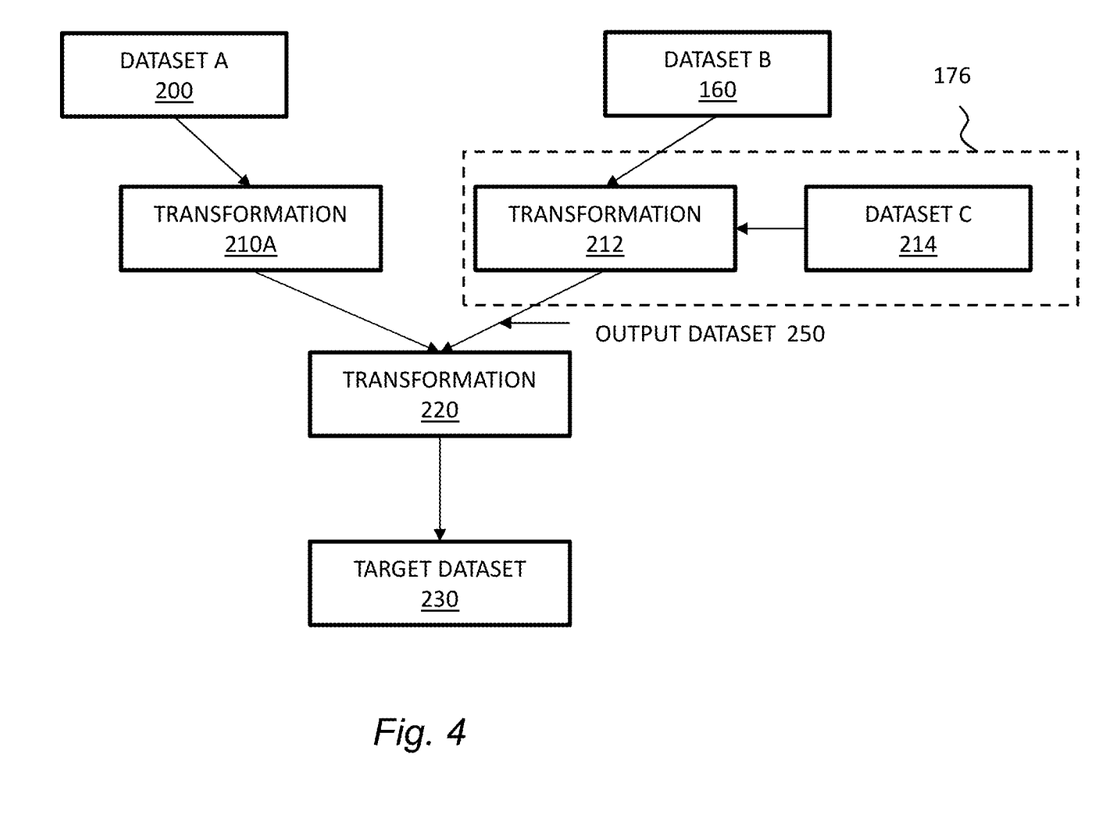
FIG. 4 is a schematic block diagram of a data processing pipeline in which one or more tasks and/or datasets may be performed externally, in accordance with example embodiments.

Referring briefly to FIG. 4, a data processing pipeline is shown as an example of how multiple tasks may be inter-related.

A first dataset "A" 162 may be a table that is applied to a first transformation 210A. The output from the first transformation 210A, and other transformations mentioned herein, may produce an output dataset. The dataset "B" 160 may be a table that is applied to a second transformation 212 which may or may not take input from another, third dataset "C" 214. The output from the second transformation 212, e.g., an output dataset, may provide input to a further, third transformation 220. The output dataset from the third transformation 220 may provide a target dataset 230 which may be a table. Although the datasets 160, 162, 214, 230 are described as tables, this is not necessarily the case.

The dashed box 176 in FIG. 4 indicates that the second transformation 212 and possibly the third dataset "C" 214 require processing resources external to the data processing platform 102. The third dataset "C" 214 may be stored in the local database 180.

For example, the second transformation 212 may be performed within a specialised statistical application such as the Statistical Analysis System (SAS) suite, or another application such as MATLAB. For example, the third dataset "C" 214 may be a confidential set of customer data or a complex model that should not in itself leave the customer system 155.

Returning back to FIG. 3, the external access system 120 and agent 170 may operate as follows.

First, a customer may request a new build using the client device 118. The form of request may be entered through a user interface, through a configuration file or through code, which enables identification of one or more datasets stored on the data processing platform 102 to provide as input to the customer system 155, and a destination identifier, which may refer to the task or transformation function that is to be performed externally. Additionally, in some embodiments, the request may also comprise one or more of an output dataset, code to be executed (e.g. as a reference to an internal file, an external file, or in the form of the code itself) and build parameters that are inputs to the external build. In the shown case, the second dataset "B" 160 is to be provided as input to the third transformation 212 of the FIG. 4 processing pipeline. Accordingly, any means of identifying the second dataset "B" 160 and the third transformation 212 may be provided in the new build request. The new build request may refer to other datasets and/or transformations in other ways, e.g. as a range or batch of datasets and/or transformations. The identification of the one or more datasets and the one or more tasks may be termed build parameters. To keep track and enable verification of builds and intercommunication between the customer system 155 and data processing platform 102, and to ensure that a user maintains the same level of access to datasets in the data processing platform as outside the data processing platform, the latter may generate a token for each new build request that may form part of the build parameters. The token serves to identify the customer, and possibly the specific user, so that the data processing platform 102 can identify and verify that received datasets and any accompanying metadata, to be explained below, comes from a verified source and in relation to a specific build request.

The build module 164, upon receiving the new build request, generates a build identifier, e.g. a unique numerical or alphanumerical identifier for the build request. The build identifier and build parameters are pushed to the run requests service 168 which stores a list of all active or new build requests. The list may comprise a list of parameters for the external build, and each new build request may be stored in a queue maintained by the co-ordinator module 166. Build requests may be stored for the same customer or for multiple different customers, so long as the build parameters can be identified.

The coordinator module 166 handles build queries that are received from the agent 170, specifically the custom plug-in 172 in this case. Upon receipt of a build query associated with a particular customer system 155, the coordinator module 166 determines if any new builds are present in the run requests service 168 for that customer system. If so, the build parameters, possibly including the build identifier, for the one or more identified new builds are provided to the external connector 174, either directly or via the custom plug-in 172. This may occur using a pull model whereby the new builds are pulled or fetched from the co-ordinator module 166. The agent 170/custom plug-in 172 may pull new builds or datasets from the co-ordinator module 166. The custom plug-in 172 may be configured to periodically poll the coordinator 166 to find new build requests in the run requests service 168 for that customer system 155. If no new build requests are found, nothing happens, and the process repeats at the next polling time.

The external connector 174 is software which processes the received build parameters for the one or more new builds. More specifically, the external connector 174 may reserve some local storage space, e.g. create a directory 175, for the temporary storage of the build parameters and any associated data. The external connector 174 may request receipt of the one or more datasets, e.g. the second dataset "B" 160 from the data processing platform 102 via the proxy/file server 178. The second dataset "B" 160 may be stored, at least temporarily, within the directory 175. The directory 175 may be particular to the specific build request identifier or a set of build request identifiers common to a particular customer. The build parameters for the task will determine which task is performed at the external system 176. The external connector 174 may thereafter provide the requested one or more datasets to the external system 176 for local processing, e.g. to apply the third transformation 212 using a locally stored third dataset "C" 214 as other input. For example, the third dataset "C" 214 may be received from the local database 180. For example, the external system 176 may be a computer or server running SAS and/or MATLAB or other task application.

The external connector 174 may also receive one or more output datasets 250 from the external system 176 resulting from performance of the requested one or more tasks of the build. The external connector 174 may thereafter send the one or more output datasets 250 back to the data processing platform 102, via the proxy/file server 178, for storage thereat. Alternatively, the one or more output datasets 250 may be transmitted back to the data processing platform 102 via the custom plug-in 172 and co-ordinator module 166 which may use the file server 178. The location where the one or more output datasets 250 are to be stored may be determined by, or specified in, the build parameters.

Upon completing the transfer of the one or more output datasets 250 to the data processing platform 102, or at some other time related to completion of the build request, the corresponding build parameters may be removed, e.g. the directory 175 deleted, or at least marked as closed or similar, to make way for later builds. Further, this maintains lockdown of the datasets, whereby data is not left in the directory 175 where it is harder to control permissions. In some embodiments, datasets may be encrypted when stored in the directory 175. This may be performed by the external connector 174. The external connector 174 may also signal or message to the custom plug-in 174 that the task has been completed, and the custom plug-in may signal the same back to the co-ordinator 166 such that the corresponding one or more build requests at the run requests service 168 may be removed or marked as closed, or similar, to make way for later new builds and to avoid repetition of the same task.

In some embodiments, the custom plug-in 172 and external connector 174 may be provided as one functional entity. In some embodiments, the external connector 174 may not store in non-volatile memory the datasets as they are received and transmitted. In other words, the datasets may be moved straight to and from the external system 176 and are only held for a short, finite period of time at the external connector 174.

Another function of the external connector 174 may be to generate metadata 252 for association with each of the one or more output datasets 250. The metadata 252 may represent anything relating to the output dataset 250, for example one or more of the build identifier, the destination address, the origin address, the requesting user or customer, the type of task performed, the application employed, the language employed, the timing of the task, the size of the output dataset, the one or more input datasets used, the ontology or schema of the input or output datasets, part or all of the code used in the task (if not confidential or too large), the version number of the code used to perform the task, the date the code was last updated, the last run date of the code, logic or dataset, logs and a hash of the code. The metadata 252 is received by the data processing platform 102 and is stored in association with the output dataset 250, e.g., it is somehow linked to the output dataset.

The external access system 120 and/or the data processing platform 102 may further be configured to transmit an update query to the external system 176, requesting receipt of updates made to code used on the external system to perform tasks. That is, if it is known that one or more datasets have been generated, or are derived from an external task initiated by a customer's external connector 174, then a check is made for any update to the code responsible for the task. The update queries may be transmitted periodically as polling requests. The update query may simply request a copy of the code that was used, for local comparison, or may examine the version number of the code to see if it corresponds with that in the metadata 252 for the output dataset 250, or may examine the time of update to see if it is later than the time in the metadata 252 indicating when the task was performed, or may compare a hash of the code contents.

In response to receiving an indication of one or more updates made to the code on the external system, the resulting dataset (and/or any other dataset generated as a result of performance of the data processing task) may be flagged as being out of date. This may include flagging datasets derived from an out of date dataset, processing errors or simply cause incorrect results to be returned. Remedial actions may be complex and time consuming.

As a result of detecting an out of date dataset, the external access system 120 and/or the data processing platform 102 may display a prompt on a user interface indicating the datasets flagged as out of date, and/or may prevent further data processing tasks being performed on the second and/or other datasets flagged as out of date. Additionally, or alternatively, the external access system 120 and/or the data processing platform 102 may automatically generate a new build request for entry into the run requests service 168 for re-performing the task on the original dataset for generating and receiving a new output dataset, and updated metadata, to replace the previous output dataset and metadata flagged as out of date or 'stale'.

Figure 5:
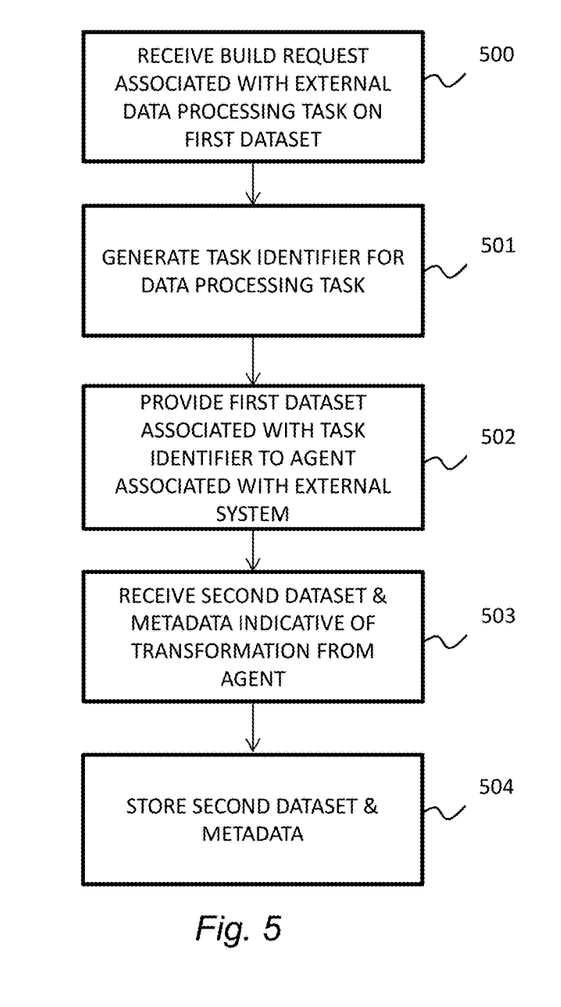
FIG. 5 is a flow diagram indicating processing operations performed by the FIG. 3 external access system in accordance with example embodiments.

FIG. 5 is a flow diagram showing example processing operations that may be performed by the external access system 120 in accordance with example embodiments. More or less operations may be involved in other embodiments. Some operations may be performed in parallel. Some operations may be performed by different modules associated with the same network location.

A first operation 500 may comprise receiving build request associated with an external data processing task on a first dataset.

A second operation 501 may comprise generating a task identifier for the data processing task.

A third operation 502 may comprise providing, which may comprise (but is not limited to) allowing data to be "pulled", the first dataset associated with the task identifier to an agent associated with an external system.

A fourth operation 503 may comprise receiving a second dataset and metadata indicative of the transformation from the agent.

A fifth operation 504 may comprise storing the second dataset and metadata.

Figure 6:
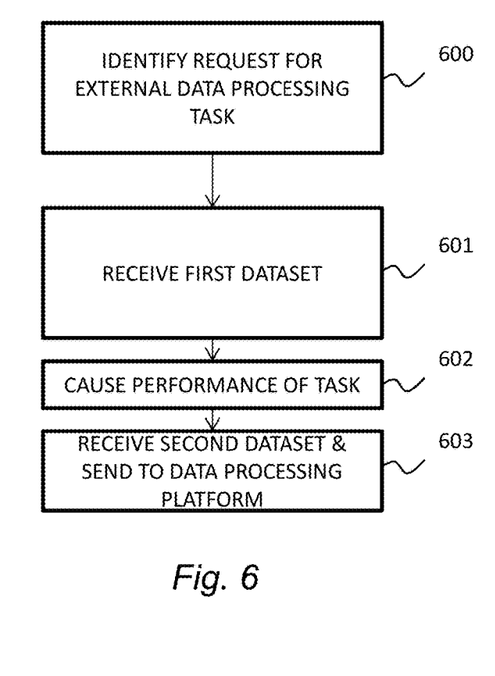
FIG. 6 is a flow diagram indicating processing operations performed by the FIG. 3 agent in accordance with example embodiments.

FIG. 6 is a flow diagram showing example processing operations that may be performed by the agent 170 in accordance with example embodiments. More or less operations may be involved in other embodiments. Some operations may be performed in parallel.

A first operation 600 may comprise identifying a request for an external data processing task.

A second operation 601 may comprise receiving a first dataset identified in the request. This may involve requesting the first dataset from a remote data processing platform.

A third operation 602 may comprise causing performance of the task. The task may be instructed or indicated in the request, as may an external system on which the task is to be performed, e.g. by code.

A fourth operation 603 may comprise receiving a second dataset and sending the second dataset to the data processing platform.

In some embodiments, a further operation may be provided between the third and fourth operations 602, 603, comprising checking (e.g. polling) the status of the external build, which may comprise statuses such as NOT_STARTED, STARTED, RUNNING, FAILED and/or SUCCEEDED.

Figure 7:
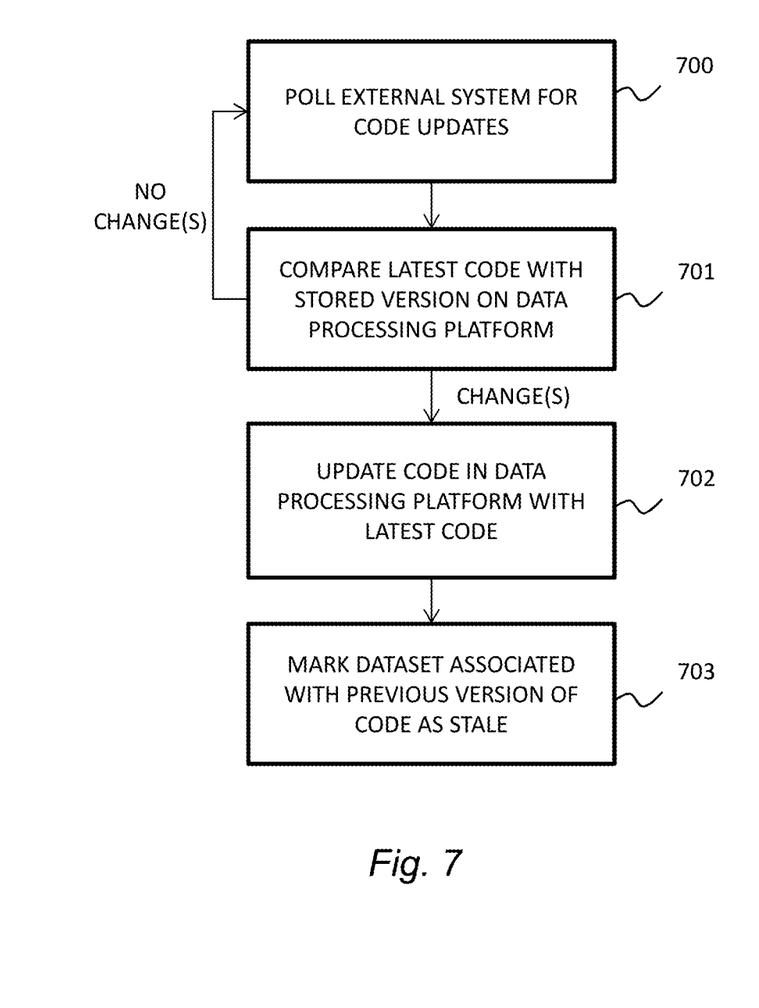
FIG. 7 is a flow diagram indicating processing operations performed as part of a code comparison task in accordance with example embodiments.

FIG. 7 is a flow diagram showing example processing operations that may be performed by the data processing platform 102, external access system 120 or agent 170 in accordance with example embodiments. More or less operations may be involved in other embodiments. Some operations may be performed in parallel. The example processing operations may relate to checking for code updates at the external system 176.

A first operation 700 may comprise polling the external system 176 for code updates.

A second operation 701 may comprise comparing the latest code version with a stored version on the data processing platform 102.

A third operation 702 may comprise, if the comparison reveals one or more modifications, updating the code in the data processing platform with the latest code.

A fourth operation 703 may comprise, optionally, marking one or more corresponding datasets associated with the previous version of the code as out of date or 'stale'.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

Advantageously, the above methods, systems and computer-readable code, according to certain embodiments, enable integration with any generic service or application which is external to the data processing platform 102. The service or application may implement a Representational State Transfer (REST) architectural style providing interoperability between networked computer systems. Alternatively, the service or application may be connected via a Java Database Connectivity (JDBC)-like interface. SAS and MATLAB are given as examples of specialised task-performing applications that may be implemented externally for generating new datasets from received or ingested datasets. By generating and storing metadata in association with externally-generated datasets, provenance and lineage of the external builds can be maintained, and issues relating to out of date or "stale" datasets can be automatically detected and, if required, action taken. The data processing platform 102 may maintain a version control system that represents all code changes on the external system 176. Further, complex code or datasets such as chemical, pharmaceutical or engineering models need not leave the external system and nor need they be re-written on a different platform.

In some embodiments, an agent 170 may be provided for respective external applications. For example, one agent may be provided for external SAS applications and other agent may be provided for MATLAB.

In some embodiments, the code that is to be executed at the external system 176 may be created via the data processing platform 102. For example, the external system 176 may not have a version control system or even a central code storage system, and hence the 'system of record' version or 'master' version of the code may be provided in the data processing platform 102. The code may be sent to the external system 176 for execution in the manner described above.

In some embodiments, the agent 170, for example the external connector 174, may only have access to a specific location on the external system 176 from where it reads code. This may enable the customer to maintain a location, e.g. one or more directories of promoted code that is considered ready and safe for execution in association with the data processing platform 102.

In some embodiments, the external connector 174 may have at least two configurations. A first, source configuration enables linking the data processing platform 102 with the external system 176, including parameters such as the external system URL and credentials. A second, build configuration may enable receipt and provision of input datasets, output datasets, code references etc.

In some embodiments, the agent 170 may reside on the same or a different server than the external system 176.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method, performed by one or more processors, the method comprising:
   receiving a build request associated with performing an external data processing task on a first dataset, the first dataset being stored in memory associated with a data processing platform to be performed at a system external to the data processing platform;
   generating a task identifier for the data processing task; and
   providing, in association with the task identifier, a build request comprising an indication of the first dataset and the data processing task to an agent associated with the external system, the agent being arranged to cause performance of the task at the external system, to receive a second dataset resulting from performance of the task, and to provide the second dataset and associated metadata indicative of the transformation to the data processing platform.

2. The method of claim 1, further comprising:
   receiving the second dataset and associated metadata from the agent associated with the external system; and
   storing the second dataset and associated metadata in the data processing platform.

3. The method of claim 2, further comprising storing the task identifier for the build request in a co-ordinator function that receives one or more build queries from the external system, or a service associated with the external system, for providing the build request to the agent.

4. The method of claim 3, wherein the co-ordinator function stores multiple task identifiers for multiple other build requests for providing one or more build requests to the agent.

5. The method of claim 4, wherein the co-ordinator function removes task identifiers, or flags task identifiers as used, responsive to receiving a completion message from the agent, such that subsequent build queries from the same external system do not cause re-provision of the same datasets.

6. The method of claim 5, wherein the one or more build queries are polling queries received periodically from the external system, or a service associated with the external system.

7. The method of claim 6, further comprising generating a token associated with the build request for enabling verification at the data processing platform that the received second dataset corresponds to the build request.

8. The method of claim 7, wherein the metadata comprises one or more of: at least part of the code used on the external system to perform the data processing task; the version number of the code used on the external system to perform the data processing task; the date the code was last updated; and a hash of the code.

9. The method of claim 8, further comprising transmitting an update query to the external system, and responsive thereto, receiving an indication of one or more updates made to code used on the external system to perform the data processing task.

10. The method of claim 9, wherein the update query is transmitted periodically as a polling request.

11. The method of claim 10, further comprising, responsive to receiving an indication of one or more updates made to the code on the external system, flagging the second dataset, and/or any other dataset generated as a result of performance of the data processing task, as being out of date.

12. The method of claim 11, further comprising displaying a prompt on a user interface indicating the second and/or other datasets flagged as out of date.

13. The method of claim 12, further comprising preventing further data processing tasks being performed on the second and/or other datasets flagged as out of date.

14. The method of claim 13, further comprising automatically generating a new build request for performing the data processing task on the first dataset for generating a new dataset to replace the second and/or other datasets flagged as out of date.

15. The method of claim 14, wherein the external data processing task comprises one task of a data processing pipeline comprising two or more tasks, and wherein the received second dataset is provided as input to a further task which performs a further data processing task to generate a third dataset.

16. A method, performed by one or more processors, the method comprising:
identifying, at a system external to a data processing platform, a build request derived from the data processing platform associated with performing a data processing task on a first dataset, the first dataset being stored in memory associated with the data processing platform; receiving, responsive to the identification, the build request, including an identification of the first dataset and the data processing task; receiving the first dataset from the data processing platform;
causing performance of the data processing task at the external system; receiving a second dataset resulting from performance of the task; and
sending the second dataset and associated metadata indicative of the transformation to the data processing platform.

17. The method of claim 16, further comprising transmitting one or more build queries to the data processing platform for causing receiving of the build request,
wherein the one or more build queries are polling queries periodically transmitted to the data processing platform.

18. The method of claim 17, further comprising receiving a token associated with the build request for transmitting to the data processing platform when requesting the first dataset and/or sending the second dataset such that the data processing platform may determine that they correspond to the build request.

19. The method of claim 18, further comprising receiving an update query from the data processing platform, and responsive thereto, transmitting an indication of one or more updates made to code to perform the data processing task.

20. The method of claim 19, further comprising, upon receiving the build request from the data processing platform, creating a directory for holding the first dataset and the second dataset and associated metadata, and removing the directory subsequent to the second dataset and associated metadata being sent to the data processing platform.

* * * * *